United States Patent [19]
Foster

[11] Patent Number: 6,029,934
[45] Date of Patent: *Feb. 29, 2000

[54] APPARATUS AND METHOD FOR DEICING AIRCRAFT

[75] Inventor: Clifton L. Foster, Kissimmee, Fla.

[73] Assignee: FMC Corporation, Lakeland, Fla.

[ * ] Notice: This patent is subject to a terminal disclaimer.

[21] Appl. No.: 09/392,524

[22] Filed: Sep. 9, 1999

Related U.S. Application Data

[63] Continuation of application No. 09/129,533, Aug. 5, 1998.

[51] Int. Cl.⁷ .................................................. B64D 15/00
[52] U.S. Cl. .................................. 244/134 C; 244/134 R
[58] Field of Search ........................... 244/134 R, 134 C

[56] References Cited

U.S. PATENT DOCUMENTS

| | | | |
|---|---|---|---|
| 3,243,123 | 3/1966 | Inghram et al. | 239/124 |
| 3,770,062 | 11/1973 | Riggs | 169/24 |
| 3,985,223 | 10/1976 | Forcella et al. | 198/479 |
| 4,007,793 | 2/1977 | Hux et al. | 169/25 |
| 4,073,437 | 2/1978 | Thorton-Trump | 239/131 |
| 4,309,049 | 1/1982 | Chevallier | 255/18 |
| 4,565,321 | 1/1986 | Vestergaard | 239/172 |
| 4,723,733 | 2/1988 | McClinchy | 244/134 |
| 5,028,017 | 7/1991 | Simmons et al. | 244/134 |
| 5,096,145 | 3/1992 | Phillips et al. | 244/134 |
| 5,104,068 | 4/1992 | Krilla et al. | 244/134 |
| 5,134,266 | 7/1992 | Peppard | 219/10.55 |
| 5,180,122 | 1/1993 | Chistian et al. | 244/134 |
| 5,244,168 | 9/1993 | Williams | 244/134 |
| 5,318,254 | 6/1994 | Shaw et al. | 244/134 |
| 5,490,646 | 2/1996 | Shaw et al. | 244/134 |
| 5,746,396 | 5/1998 | Thorton-Trump | 244/134 |
| 5,755,404 | 5/1998 | Numbers | 244/134 |

FOREIGN PATENT DOCUMENTS

| 195 22 881 C1 | 11/1996 | Germany | B60S 3/04 |
|---|---|---|---|

*Primary Examiner*—J. Woodrow Eldred
*Attorney, Agent, or Firm*—Allen, Dyer, Doppelt, Milbrath & Gilchrist, P.A. Attorneys at Law

[57] ABSTRACT

An apparatus for deicing aircraft includes a vehicle frame, such as part of a truck, and a boom having one end mounted on the vehicle frame and a free end. A compressor unit is supported by the boom and includes a motor having an output and a centrifugal compressor operatively connected to the motor output. A deicer air jet nozzle is located at the boom and operatively coupled to the air outlet of the centrifugal compressor for receiving air and discharging the air for a deicer application.

43 Claims, 5 Drawing Sheets

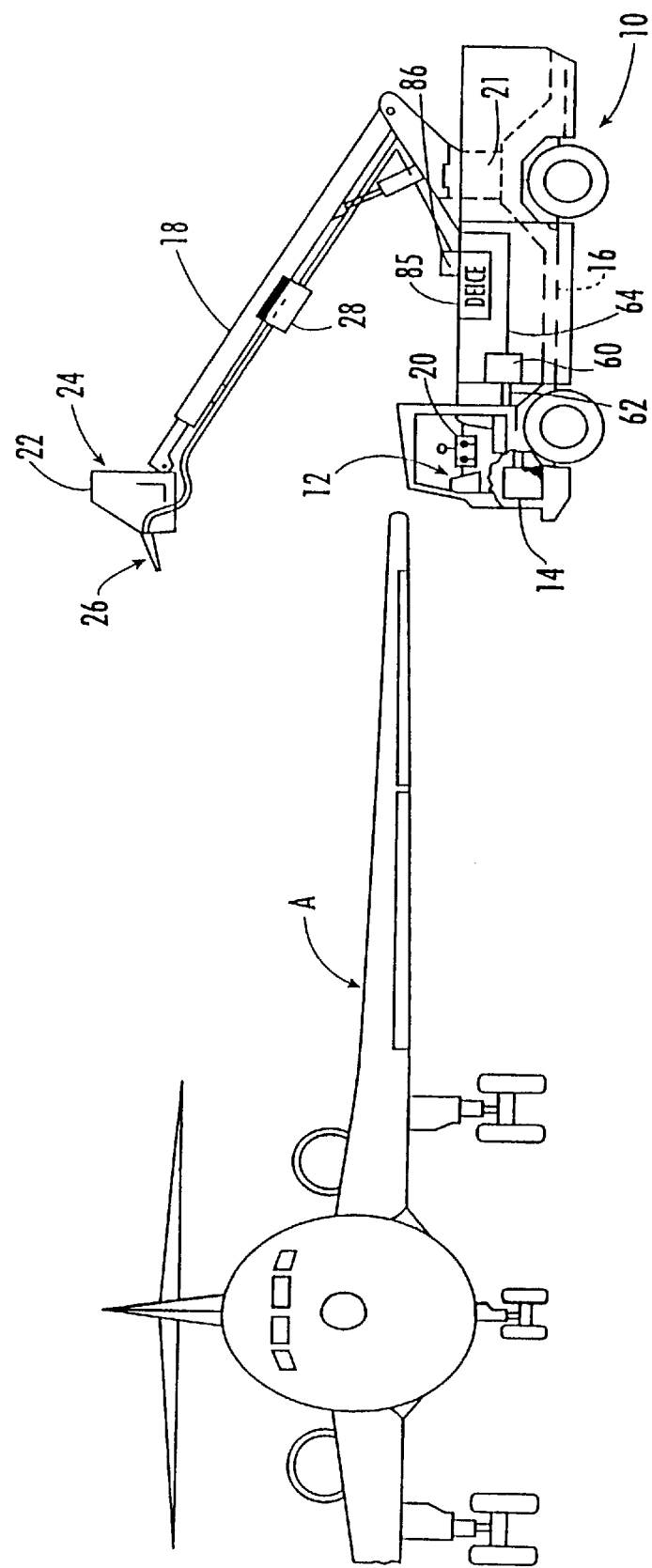

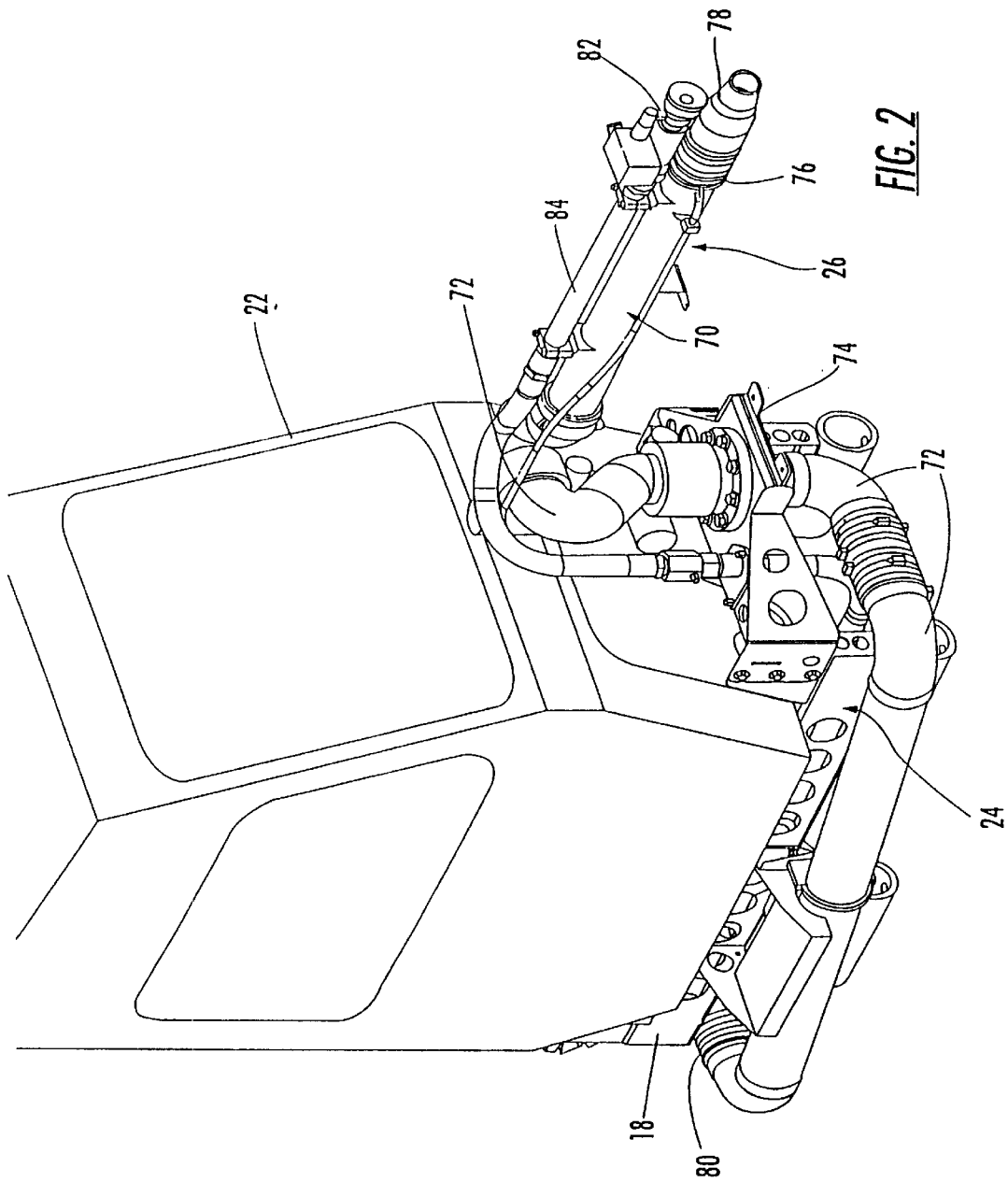

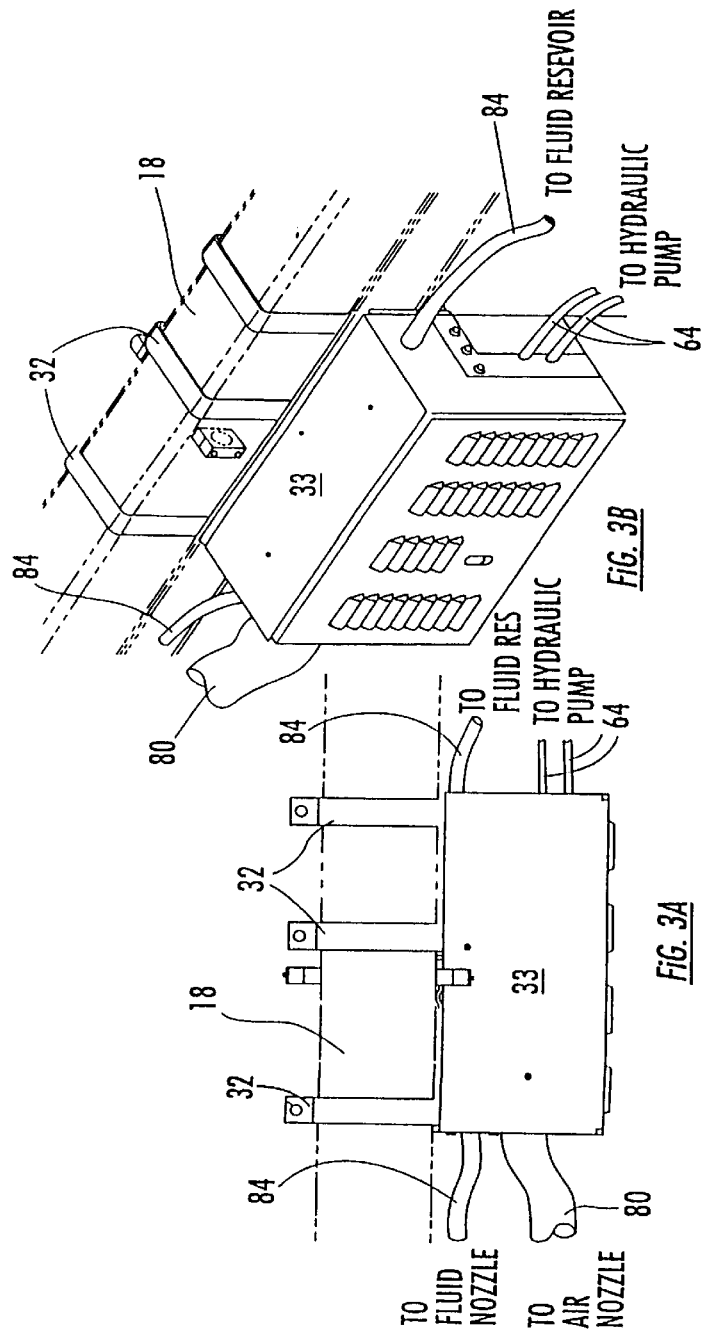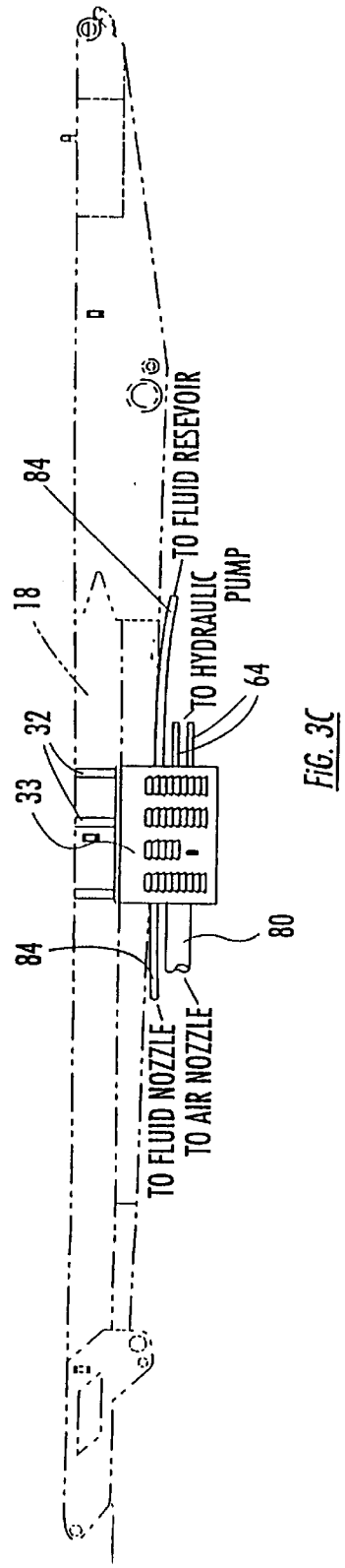

APPARATUS AND METHOD FOR DEICING AIRCRAFT

This application is a continuation of Ser. No. 09/129,533 filed on Aug. 5, 1998 pending.

FIELD OF THE INVENTION

The present invention relates to the field of aircraft deicing, and more particularly, the present invention relates to an apparatus and method for deicing aircraft using forced air from a compressor unit.

BACKGROUND OF THE INVENTION

Some deicing systems and methods used for deicing snow and ice-covered aircraft surfaces use an apparatus that sprays large quantities of deicing fluids onto the aircraft surfaces. Typically, this has been accomplished by spraying a heated antifreeze fluid (e.g., a glycol and water mixture) onto the iced surfaces of the aircraft, together with a large quantity of compressed air. An example includes the system disclosed in U.S. Pat. No. 5,244,168, the disclosure which is hereby incorporated by reference in its entirety, where a nozzle mixes pressurized air and deicing fluid to provide a spray pattern for application to the aircraft to deice the aircraft.

Other systems separate the glycol and water mixture from the compressed air and include a separate nozzle for discharging compressed air by providing a forced air deicing system having a powerful compressed air source. Typically, these systems include a vehicle frame, such as the chassis of a truck, having a boom with one end mounted on the vehicle frame and a free end. An operator cab is positioned at the free end of the boom and a deicer air jet nozzle is connected at the free end of the boom, typically mounted on the operator cab for operator control.

Many of these systems use very powerful jet engine air start units. The air exits the nozzle at a temperature of 300° F. to 400° F. above ambient. As a result, some of the ice and snow is melted and can migrate into crevices on the aircraft. The aircraft acts as a heat sink because the large mass of the aircraft remains at subfreezing temperatures. Thus, sensitive sensors and critical trailing edge flaps may become frozen and ineffective.

Typically, this type of compressor is capable of 300 to 500 horsepower and provide 300 to 400 pounds a minute of compressed air. The units are very inefficient producing unnecessary hot air and excessive noise. Additionally, these systems are very heavy and must be positioned near the vehicle frame, a long distance from the operator cab carrying an air jet nozzle. As a result, long tubes must extend from the vehicle frame along the boom to the operator cab where the nozzles are located. These long runs from the compressor can cause thermodynamic and pneumatic deficiencies.

Also, any system that injects fluid at high pressure into the air stream has a drawback because the fluid could act as a cutting medium and damage aircraft surfaces. Therefore, it is essential in some instances to keep a great distance from the aircraft to avoid damaging the aircraft with the high pressure fluid, thus making the forced air system ineffective.

SUMMARY OF THE INVENTION

It is therefore an object of the present invention to provide an apparatus and method for deicing aircraft where a compressor unit, including any motor driving the compressor, can be mounted on the boom, proximate to a deicer air jet nozzle.

It is still another object of the present invention to provide an apparatus and method for deicing aircraft that uses forced air discharge that is efficient and uses a compressor unit that is lightweight, but generates an air discharge from a deicer air jet nozzle that is appropriate for deicing aircraft under frigid conditions, but also does not discharge at temperatures substantially above ambient temperature.

In accordance with the present invention, an apparatus and method for deicing aircraft now allows a compressor unit to be mounted on the vehicle boom by the use of a centrifugal compressor, such as the type of compressor commonly used when supercharging internal combustion engines. This type of compressor is directly connected to a motor output, which in a preferred aspect of the invention is a hydraulic motor via a transmission, such as a belt, and in a preferred aspect, a drive gear unit. The centrifugal compressor includes an impeller and outlet as is normal with many of the superchargers used in automobile vehicle engines. The apparatus includes a vehicle frame and a boom having one end mounted on the vehicle frame and a free end. The compressor unit is mounted on the boom proximate to the free end and a deicer air jet nozzle is connected at the free end of the boom and operatively coupled to the air outlet of the centrifugal compressor for receiving air and discharging the air for a deicer application.

A hydraulic pump is mounted on the vehicle frame and hydraulic feed lines extend from the hydraulic pump along the boom to the hydraulic motor for supplying hydraulic fluid under pressure to the hydraulic motor. The vehicle frame can typically include a vehicle engine, such as normal with a truck. A transmission is driven from the vehicle engine and interconnects the hydraulic pump for supplying power to the hydraulic motor.

A drive gear unit is operatively connected between the centrifugal compressor and the hydraulic motor for stepping up the revolutions per minute of the centrifugal compressor relative to the output of the hydraulic motor. The drive gear unit further comprises an input spur gear driven from the hydraulic motor and an output spur gear driving the centrifugal compressor. The input spur gear and output spur gear define about a 2:1 to about 4:1 gear ratio. The deicer air jet nozzle defines an axisymmetric contour having a converging portion. An example of such an air jet nozzle is disclosed in U.S. Pat. No. 5,755,404, the disclosure which is hereby incorporated by reference in its entirety.

Typically, a fluid nozzle is mounted on the deicer air jet nozzle. A source of deicing fluid could be mounted at the vehicle frame and a supply tube interconnects the source of deicing fluid in the fluid nozzle. A pump is operatively connected to the source and supply tube and pumps deicing fluid from the source of deicing fluid through the supply tube and fluid nozzle. Typically, if an aircraft contains much ice, the deicing fluid would be placed on the ice to aid in melting the ice. A centrifugal pump can typically inject deicing fluid into the air stream at 100 to 200 PSIG. Any greater pressure could create problems with aircraft damage.

A method aspect is also disclosed and includes the steps of compressing air within a centrifugal compressor located on a vehicle boom by driving a motor coupled to the centrifugal compressor and discharging the air from a deicer air jet nozzle attached to the end of the vehicle boom such that air is forced outward from the deicer air jet nozzle at about 100 pounds per minute.

BRIEF DESCRIPTION OF THE DRAWINGS

Other objects, features and advantages of the present invention will become apparent from the detailed description of the invention which follows, when considered in light of the accompanying drawings in which:

FIG. 1 illustrates a deicing apparatus of the present invention with a truck containing a boom and a deicer assembly positioned on the boom for providing compressed air to the deicer air jet nozzle that is mounted at an operator cab positioned at the free end of the boom.

FIG. 2 is an enlarged isometric view of the operator cab and the deicer air jet nozzle and a fluid nozzle mounted at the operator cab at the free end of the boom.

FIGS. 3A through 3C illustrate a deicer assembly of the present invention contained in a housing and mounted on the boom.

DETAILED DESCRIPTION OF THE PREFERRED EMBODIMENTS

Figure 4:
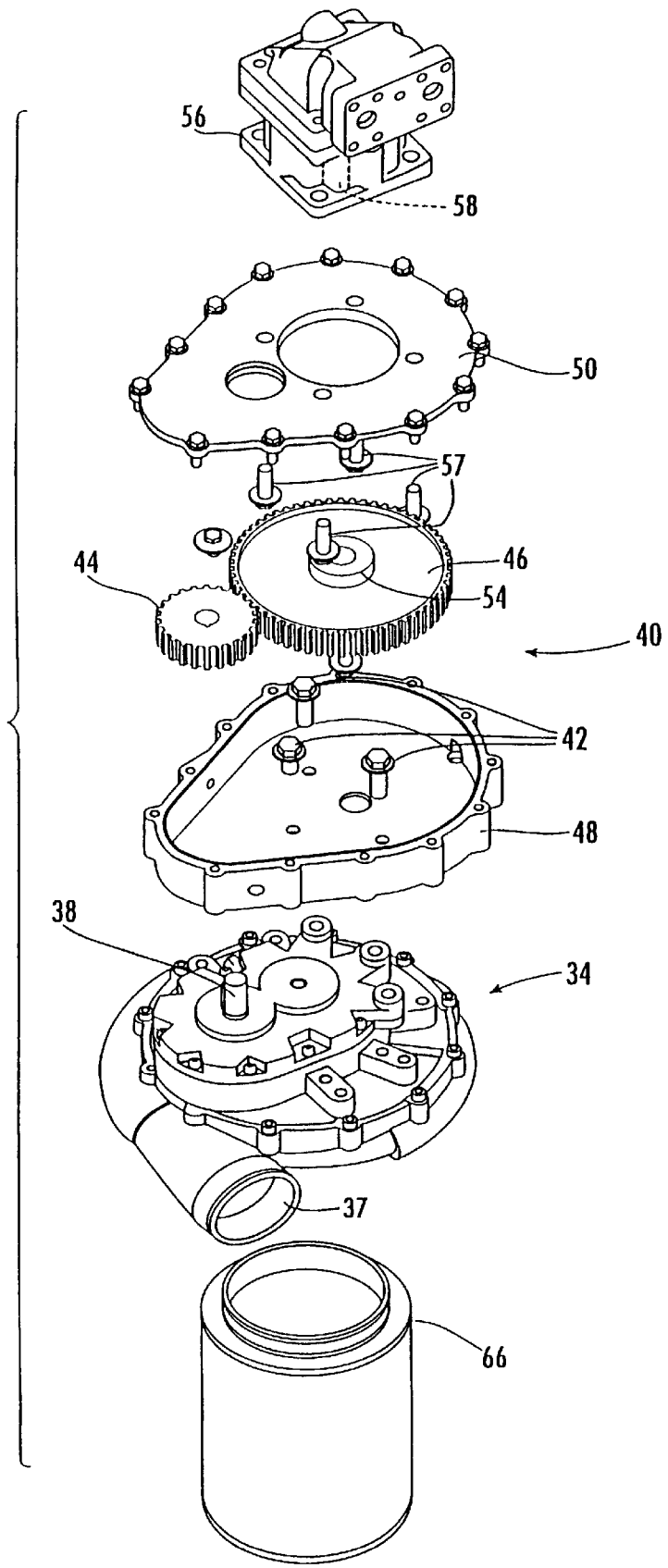
FIG. 4 is an exploded isometric view of a compressor unit of the present invention and showing the hydraulic motor, centrifugal compressor and drive gear unit.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous because it now provides for an efficient apparatus and method for deicing aircraft without using expensive and powerful compressors and motors that must be positioned on a vehicle frame and far from any air nozzles. A deicer assembly of the present invention includes a centrifugal compressor and motor, which are lightweight and can be mounted on the boom connected to a vehicle frame, and thus, located proximate to an operator cab positioned at the free end of the boom. The motor is preferably a hydraulic motor. The compressor and hydraulic motor can be placed on the boom so that only hydraulic hoses from the hydraulic pump driven by a vehicle engine or separate auxiliary engine should be threaded or mounted along the boom, thus reducing the weight applied on the boom. Additionally, the use of the deicer air jet nozzle having an axisymmetric contour, such as disclosed in the above-identified and incorporated by reference '404 patent, allows the compressor to work in conjunction with the nozzle to provide a source of air at about 80 to 120 pounds per minute, which exits typically at no more than 15° to 30° F. above ambient in typical applications. Also, the pressure is discharged from about 13 to 14 PSIG, above atmospheric pressure.

Referring now to FIG. 1, there is illustrated a truck 10, which includes a vehicle cab 12 and vehicle engine 14 under the vehicle cab. The vehicle cab 12 and engine 14 are mounted on the vehicle frame 16. A boom 18 has one end pivotally mounted on the vehicle frame 16 in such a manner to allow both vertical and circular movement of the boom. A control panel 20 is located in the vehicle cab 12 and actuates the boom 18 by means of a corresponding hydraulic assembly 21 to move the boom in a desired vertical direction and turn the boom in the desired angular position. Naturally, the boom 18 could be located on a vehicle frame 16, such as a trailer or platform, that might extend outward from the rear of a large truck.

As shown further in FIG. 1, an operator cab 22 is positioned at the free end 24 of the boom. An operator sits in the operator cab 22 to operate a deicer air jet nozzle 26, which in turn, is positioned at the free end of the boom, and typically at the end of the boom or directly on the operator cab. FIG. 1 also illustrates greater details of an air jet nozzle mounted on the end of the boom, as will be explained in detail below. A deicer assembly 28 is also mounted on the boom and, in accordance with the present invention, is located proximate to the deicer air jet nozzle 26. Thus, the present invention is different from many prior art devices, where compressors and any large powerful motors driving any compressors were located on the vehicle frame due to the large and typically inefficient components used in these systems.

Figure 5:
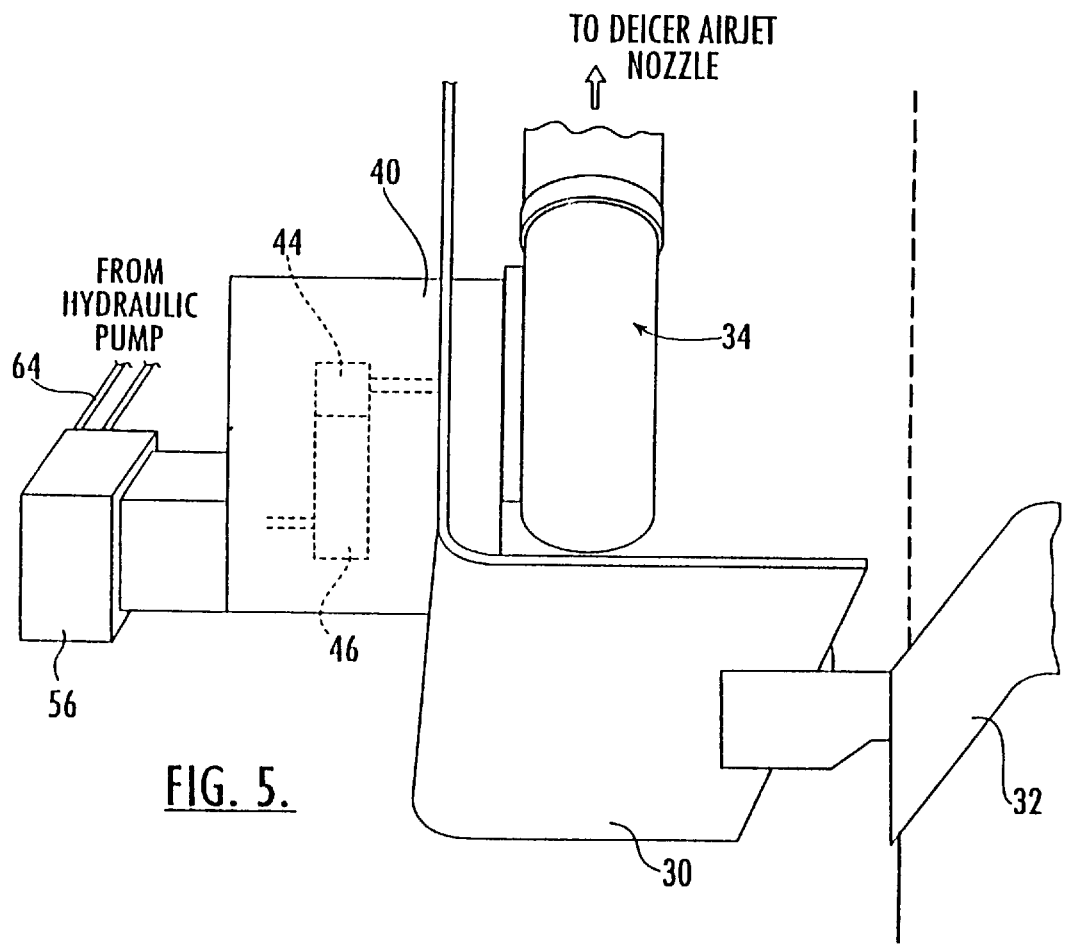
FIG. 5 is a schematic drawing showing the centrifugal compressor fixed to a compressor mounting frame and a mounting bracket that secures the compressor mounting frame to the boom of a vehicle.
Figure 6:
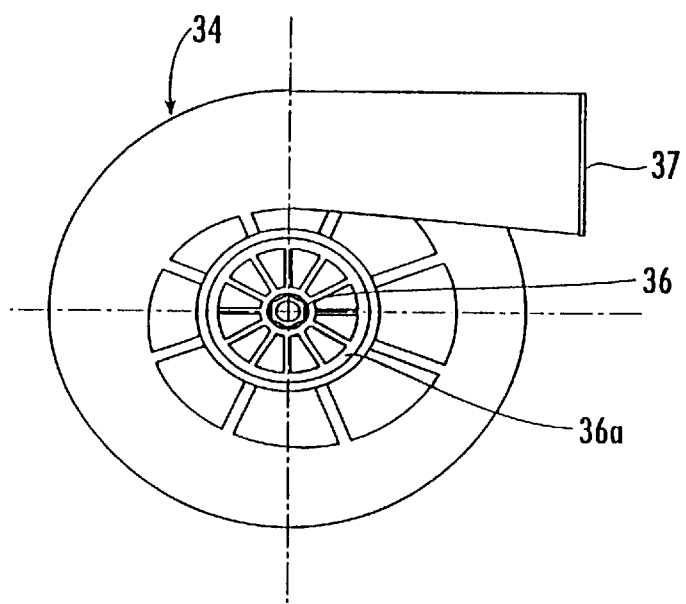
FIG. 6 is a schematic view of a centrifugal compressor that can be used with the present invention.

Referring now more particularly to FIGS. 4–6, details of the deicer assembly 28 are illustrated. A compressor mounting frame 30 has a mounting mechanism 32, in the form of brackets, positioned on the compressor mounting frame 30, which secure the compressor mounting frame 30 to the boom as shown in FIG. 5. The compressor mounting frame can be formed as a rigid L-shaped, metal support plate. The mounting brackets 32 can be formed as flexible metal straps (FIGS. 3A–3C). A centrifugal compressor 34 is fixed to the compressor mounting frame 30. As shown in FIGS. 4 and 6, the centrifugal compressor 34 is designed similar to the centrifugal compressors used as in supercharger systems on many automobiles. One design that has been found efficient for the present invention is a centrifugal compressor used as a supercharger under the tradename "V4X Supercharger" as manufactured by Vortech Engineering, Inc. of Morpark, Calif., and disclosed in greater detail in U.S. Pat. No. 5,224,459, the disclosure which is hereby incorporated by reference in its entirety.

The centrifugal compressor 34 includes a rotating impeller 36 (FIG. 6) that is mounted on internal bearings (not shown) at the air intake 36a. The rotating impeller 36 includes an internal gear that is connected to another internal gear and power input shaft 38, such that the speed of the impeller can be increased by the internal gear ratio. Typically, the internal gears can be a helically designed set of gears with an aluminum, backward curved impeller 36. The compressor can typically have an air pressure of 29 PSIG, and reaches a 1700 cubic feet per minute flow rate.

A drive gear unit 40 is mounted on the centrifugal compressor by appropriate fasteners 42, such as bolts, as illustrated. The drive gear unit 40 includes an output spur gear 44 connected to the input shaft 38 of the centrifugal compressor 34. The output spur gear 44 is designed as a pinion gear that meshes with an input spur gear 46. Both the input and output spur gears 44,46 are contained in a gear case box 48 having an appropriate gear case cover 50. A power shaft is connected on an a hub 54 near the central portion of the larger input spur gear.

A hydraulic motor 56, such as a standard industrial hydraulic motor sold under the series F12 unit, manufactured by VOAC Hydraulics Division, S-461 82, Trollhatton, Sweden, of Parker Hydraulics, is mounted on the drive gear unit 40 via bolts 57 and has an output 58 that connects to the hub 54 located on input spur gear 46. The series F12 is a hydraulic motor that is a bent axis, fixed displacement heavy duty motor. It can be used for both open and closed loop applications. The motor has a unique spherical piston design and can typically run at high shaft speeds. It has operating pressures to 7,000 psi, and provides for high output power capability. A 40° angle between shaft and cylinder barrel allows for a compact, lightweight motor. It is evident in FIG. 5 that the centrifugal compressor 34, drive gear unit 40 and hydraulic motor 56 form one complete compressor unit that is secured by the compressor mounting frame 30 and mounting brackets 32 to the boom 18. Naturally, other motor designs could be used as long as the motor designs, whether electrical or hydraulic, meet the design parameters necessary for driving the compressor.

In a preferred aspect of the present invention, a hydraulic pump 60 is mounted on the vehicle frame and typically operates by a cam or other transmission system 62 driven from the vehicle engine 14 or auxiliary engine. However, other locations and pump transmissions could be used depending on the vehicle design and type of components used in the present invention. Hydraulic lines 64 extend between the hydraulic pump 60 and the hydraulic motor 56 as shown in FIGS. 1 and 3A–3C, which provides the hydraulic fluid power necessary for driving the hydraulic motor. An air cleaner 66 is mounted at the impeller air intake area 68 of the centrifugal compressor to filter any air entering the centrifugal compressor.

Referring now to FIG. 2, further details of the operator cab and the deicer air jet nozzle 26 are illustrated and described.

In one preferred aspect of the present invention, the deicer air jet nozzle 26 is the type of nozzle disclosed in the above-identified and incorporated by reference '404 patent. The nozzle 26 typically uses a tubular structure 70 having rigid conduit segments 72 and a stationary support 74. Typically, the nozzle includes an axisymmetric contour portion 76 and a converging portion 78 at the nozzle. An air supply tube 80 extends rearward to the air outlet 37 at the impeller 36 of the centrifugal compressor. As illustrated, a fluid nozzle 82 is positioned on the deicer air jet nozzle 26 and includes a fluid feed tube 84 that extends along the boom 18 to a reservoir of deicer fluid, illustrated generally at 85, typically formed from a glycol and water mixture. A centrifugal fluid pump 86 is operated by an operator in the operator cab to energize the pump and force fluid through the supply tube and through the fluid nozzle.

In operation, an operator in the operator cab can move the operator cab into a desired position and angle adjacent the aircraft. If a large amount of ice is located on a wing, the operator can energize the fluid pump 86 to pump fluid from the fluid reservoir 85 through the fluid nozzle 82 onto the wing of a airplane to provide initial deicing of any thick ice positioned on the wing. Preferably, no fluid is used, only a jet of air is discharged if no ice is present. After the glycol/water mixture has been placed onto the wing (if used), the operator energizes the hydraulic pump directly from the vehicle engine to drive the hydraulic motor and force the centrifugal compressor into operation by means of the hydraulic motor. About 80 to 120 pounds of air per minute are discharged through the deicer air jet nozzle at about 13 to 14 PSIG, and about 15° to 30° F. above ambient temperature with the use of the nozzle described above.

Naturally, the amount of air discharged through the deicer air jet nozzle 26 can vary depending on the end use needs. Because the centrifugal compressor 34 and the associated hydraulic motor and drive gear unit are positioned on the boom, and proximate to the deicer air jet nozzle, more efficient use is made of the compressor. Additionally, air with high pressure deicing fluid injected is not used as in some prior art system which under certain conditions, could create a cutting fluid. When injected fluid is needed, the injected deicing fluid used is at 100 to 200 PSIG pressure and cannot damage the aircraft. Also, an efficient use is made of a centrifugal compressor, drive gear unit and hydraulic motor, such that horsepower requirements for deicing are reduced. Thus, the centrifugal compressor and hydraulic motor can be mounted on the boom, as compared to many prior art devices where any air compressor and associated drive units were mounted on the vehicle frame.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An apparatus for deicing aircraft comprising:
   a vehicle frame;
   a boom having an end mounted on the vehicle frame and a free end;
   a compressor unit supported by the boom, said compressor unit comprising:
      a hydraulic motor having an output, and
      a centrifugal compressor operatively connected to the hydraulic motor output and having an impeller and an air outlet; and
   a deicer air jet nozzle located at the boom and operatively coupled to the air outlet of the centrifugal compressor for receiving air and discharging the air for a deicer application.

2. An apparatus according to claim 1, and further comprising a hydraulic pump mounted on the vehicle frame and hydraulic feed lines extending from said hydraulic pump along said boom to said hydraulic motor for supplying hydraulic fluid under pressure to said hydraulic motor.

3. An apparatus according to claim 2, wherein said vehicle frame includes a vehicle engine, and a transmission driven from said vehicle engine and interconnecting said hydraulic pump for supplying power to said hydraulic pump.

4. An apparatus according to claim 1, and further comprising a drive gear unit operatively connected between said centrifugal compressor and said hydraulic motor for stepping up the revolutions per minute of said centrifugal compressor relative to the output of said hydraulic motor.

5. An apparatus according to claim 4, wherein said drive gear unit further comprises an input spur gear driven from said hydraulic motor and an output spur gear driving said centrifugal compressor.

6. An apparatus according to claim 5, wherein input spur gear and output spur gear defines about a 2:1 to about 4:1 gear ratio.

7. An apparatus according to claim 1, wherein said deicer air jet nozzle defines an axisymmetric contour having a converging portion.

8. An apparatus according to claim 1, and further comprising a fluid nozzle mounted on said deicer air jet nozzle, a source of deicing fluid, a supply tube interconnecting said source of deicing fluid and fluid nozzle, and a centrifugal fluid pump for pumping deicing fluid from the source of deicing fluid and through the supply tube and fluid nozzle.

9. An apparatus according to claim 1, wherein said centrifugal pump forces air through said deicer air jet nozzle at about 80 to about 100 pounds per minute.

10. An apparatus for deicing aircraft comprising:
a vehicle frame;
a boom having an end mounted on the vehicle frame and a free end;
a compressor unit supported by the boom, said compressor unit comprising:
  a motor having an output, and
  a centrifugal compressor operatively connected to the motor output and having an impeller and an air outlet; and
a deicer air jet nozzle located at the boom and operatively coupled to the air outlet of the centrifugal compressor for receiving air and discharging the air for a deicer application.

11. An apparatus according to claim 10, wherein said centrifugal compressor forces air through said deicer air jet nozzle at about 80 to 100 pounds per minute.

12. An apparatus according to claim 10, wherein said motor comprises a hydraulic motor, and further including a hydraulic pump and hydraulic feed lines extending from said hydraulic pump to said hydraulic motor.

13. An apparatus according to claim 12, wherein said hydraulic pump is mounted on said vehicle frame, and said hydraulic feed lines extend from said hydraulic pump along said boom to said hydraulic motor for supplying hydraulic fluid under pressure to said hydraulic motor.

14. An apparatus according to claim 13, and further comprising a hydraulic pump mounted on the vehicle frame and hydraulic feed lines extending from said hydraulic pump along said boom to said hydraulic motor for supplying hydraulic fluid under pressure to said hydraulic pump.

15. An apparatus according to claim 14, including an engine mounted on said vehicle frame and a transmission driven from said vehicle engine and interconnecting said hydraulic pump for supplying power to said hydraulic pump.

16. An apparatus according to claim 10, wherein said deicer air jet nozzle defines an axisymmetric contour having a converging portion.

17. An apparatus according to claim 10, and further comprising a fluid nozzle mounted on said deicer air jet nozzle, a source of deicing fluid, a supply tube interconnecting said source of deicing fluid and fluid nozzle, and a centrifugal fluid pump for pumping deicing fluid from the source of deicing fluid and through the supply tube and fluid nozzle.

18. An apparatus for deicing aircraft comprising:
a vehicle frame;
a boom having an end mounted on the vehicle frame and a free end;
a compressor unit supported by the boom, said compressor unit comprising:
  a motor having an output,
  an input spur gear connected to the motor output,
  an output spur gear meshing with the input spur gear;
  a centrifugal compressor operatively connected to the output spur gear and having an impeller and an air outlet; and
a deicer air jet nozzle located at the boom and operatively coupled to the air outlet of the centrifugal compressor for receiving air and discharging the air for a deicer application.

19. An apparatus according to claim 18, wherein said centrifugal compressor forces air through said deicer air jet nozzle at about 100 pounds per minute.

20. An apparatus according to claim 18, wherein said motor comprises a hydraulic motor, and further including a hydraulic pump and hydraulic feed lines extending from said hydraulic pump to said hydraulic motor.

21. An apparatus according to claim 20, wherein said hydraulic pump is mounted on said vehicle frame, and said hydraulic feed lines extend from said hydraulic pump along said boom to said hydraulic motor for supplying hydraulic fluid under pressure to said hydraulic motor.

22. An apparatus according to claim 21, wherein said vehicle frame includes a vehicle engine, and a transmission driven from said vehicle engine and interconnecting said hydraulic pump for supplying power to said hydraulic pump.

23. An apparatus according to claim 18, wherein said deicer air jet nozzle defines an axisymmetric contour having a converging portion.

24. An apparatus according to claim 18, and further comprising a fluid nozzle mounted on said deicer air jet nozzle, a source of deicing fluid, a supply tube interconnecting said source of deicing fluid and fluid nozzle, and a centrifugal fluid pump for pumping deicing fluid from the source of deicing fluid and through the supply tube and fluid nozzle.

25. A deicer assembly comprising:
a compressor mounting frame;
a mounting mechanism secured to the frame for attaching the compressor mounting frame to a boom of a vehicle;
a centrifugal compressor mounted on the compressor mounting frame, said centrifugal compressor having an input shaft, an impeller and an air outlet;
a drive gear unit mounted on the centrifugal compressor, and having an input spur gear and output spur gear connected to the input shaft of the centrifugal compressor; and
a hydraulic motor mounted on the drive gear unit and having an output connected to the input spur gear.

26. An apparatus according to claim 25, wherein said drive gear unit defines about a 2:1 to about 4:1 gear ratio.

27. A method for deicing aircraft comprising the steps of:
compressing air within a centrifugal compressor supported by a vehicle boom by driving a motor coupled to the centrifugal compressor; and
discharging the air from a deicer air jet nozzle located at the vehicle boom such that air is forced outward from the deicer air jet nozzle.

28. A method according to claim 27, wherein the air is discharged from the deicer air jet nozzle at about 10 to about 13 pounds per square inch.

29. A method according to claim 27, wherein the air is discharged through air jet nozzle that defines an axisymmetric contour having a converging portion.

30. A method according to claim 27, and further comprising the step of hydraulically driving the motor, wherein the motor comprises a hydraulic motor.

31. A method according to claim 30, and further comprising the step of driving the hydraulic motor from a hydraulic pump located on a vehicle frame.

32. A method according to claim 31, and further comprising the step of operating the hydraulic pump from directly from the engine used for driving the vehicle.

33. A method according to claim 30, and further comprising the step of stepping up the revolutions per minute of the centrifugal compressor relative to the output of the motor by a gear drive coupled between the centrifugal compressor and the motor.

34. A method according to claim 27, and further comprising the step of discharging the air from the nozzle at above 15 degrees above ambient temperature.

35. An apparatus according to claim 1, wherein said deicer air jet nozzle is located at the free end of the boom.

36. An apparatus according to claim 1, wherein said deicer air jet nozzle is supported by the boom.

37. An apparatus according to claim 10, wherein said deicer air jet nozzle is located at the free end of the boom.

38. An apparatus according to claim 10, wherein said deicer air jet nozzle is supported by the boom.

39. An apparatus according to claim 18, wherein said deicer air jet nozzle is located at the free end of the boom.

40. An apparatus according to claim 18, wherein said deicer air jet nozzle is supported by the boom.

41. A method according to claim 27, and further comprising the step of discharging the air from the deicer air jet nozzle at about 100 pounds per minute.

42. A method according to claim 27, wherein the deicer air jet nozzle is located at the free end of the boom.

43. A method according to claim 27, wherein the deicer air jet nozzle is supported by the boom.

* * * * *

Disclaimer 6,029,934 — Clifton L. Foster, Kissimmee, Fla. APPARATUS AND METHOD FOR DEICING AIRCRAFT. Patent dated Feb. 29, 2000. Disclaimer filed Feb. 22, 2001, by the assignee FMC Corporation.
Hereby enters this disclaimer to claims 1-43, of said patent.

*(Official Gazette February 25, 2003)*

(12) EX PARTE REEXAMINATION CERTIFICATE (4914th)
United States Patent
Foster

(10) Number: US 6,029,934 C1
(45) Certificate Issued: Mar. 2, 2004

(54) APPARATUS AND METHOD FOR DEICING AIRCRAFT

(75) Inventor: Clifton L. Foster, Kissimmee, FL (US)

(73) Assignee: FMC Corporation, Lakeland, FL (US)

Reexamination Request:
No. 90/005,860, Nov. 17, 2000

Reexamination Certificate for:
Patent No.: 6,029,934
Issued: Feb. 29, 2000
Appl. No.: 09/392,524
Filed: Sep. 9, 1999

Disclaimer of Claims 1 through 43 Filed Feb. 22, 2001 (1267 O.G. 37).

(*) Notice: This patent is subject to a terminal disclaimer.

Related U.S. Application Data

(63) Continuation of application No. 09/129,533, filed on Aug. 5, 1998, now Pat. No. 6,045,092.

(51) Int. Cl.$^7$ ............................................. B64D 15/00
(52) U.S. Cl. .............................. 244/134 C; 244/134 R
(58) Field of Search .......................... 244/134 R, 134 C

(56) References Cited

U.S. PATENT DOCUMENTS

| | | | | |
|---|---|---|---|---|
| 2,788,009 A | * | 4/1957 | Lones | 134/102 |
| 3,243,123 A | * | 3/1966 | Inghram et al. | 239/124 |
| 3,770,062 A | * | 11/1973 | Riggs | 169/24 |
| 3,985,223 A | * | 10/1976 | Forcella et al. | 168/479 |
| 4,007,793 A | * | 2/1977 | Hux et al. | 169/25 |
| 4,073,437 A | * | 2/1978 | Thorton-Trump | 239/131 |
| 4,309,049 A | * | 1/1982 | Chevallier | 255/18 |
| 4,423,980 A | | 1/1984 | Warnock | 404/83 |
| 4,565,321 A | * | 1/1986 | Vestergaard | 239/172 |
| 4,723,733 A | * | 2/1988 | McClinchy | 244/134 |
| 5,028,017 A | * | 7/1991 | Simmons et al. | 244/134 |
| 5,069,400 A | * | 12/1991 | Kovaletz | 244/136 |
| 5,096,145 A | * | 3/1992 | Phillips et al. | 244/134 |
| 5,104,068 A | * | 4/1992 | Krilla et al. | 244/134 |
| 5,134,266 A | * | 7/1992 | Peppard | 219/10.55 |
| 5,180,122 A | * | 1/1993 | Christian et al. | 244/134 |
| 5,244,168 A | * | 9/1993 | Williams | 244/134 |
| 5,318,254 A | * | 6/1994 | Shaw et al. | 244/134 |
| 5,490,646 A | * | 2/1996 | Shaw et al. | 244/134 |
| 5,746,396 A | * | 5/1998 | Thorton-Trump | 244/134 |
| 5,755,404 A | * | 5/1998 | Numbers | 244/134 |
| 6,047,926 A | * | 4/2000 | Stanko et al. | 244/134 C |

OTHER PUBLICATIONS

"Aircraft Ground Deicing" SAE Aerospace Conference Jun. 11–13, 1997 Pittsburgh Pa.*
Giroux, "Hot Air Blast System: An Alternative to Heated Glycol Deicing" (Jun. 12, 1997).
Allied Signal's Augmented Forced–Air Deicing (AFAD, Allied Signal Aerospace (Oct. 22, 1996).

* cited by examiner

Primary Examiner—Galen L. Barefoot

(57) ABSTRACT

An apparatus for deicing aircraft includes a vehicle frame, such as part of a truck, and a boom having one end mounted on the vehicle frame and a free end. A compressor unit is supported by the boom and includes a motor having an output and a centrifugal compressor operatively connected to the motor output. A deicer air jet nozzle is located at the boom and operatively coupled to the air outlet of the centrifugal compressor for receiving air and discharging the air for a deicer application.

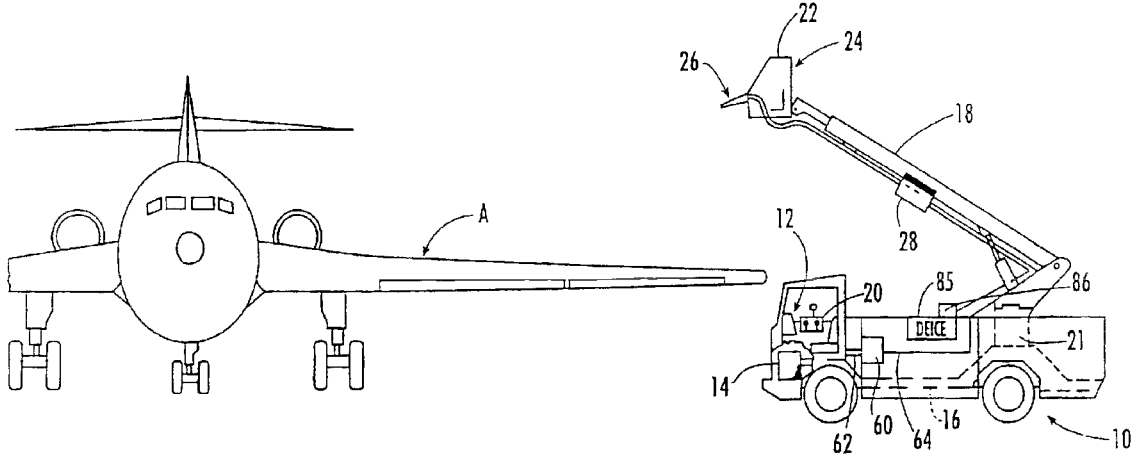

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–43 are now disclaimed.

* * * * *